United States Patent
Brunswig et al.

(10) Patent No.: US 8,745,690 B2
(45) Date of Patent: Jun. 3, 2014

(54) DERIVING SERVICE PROVIDER CONSTRAINTS FROM SERVICE CONSUMER CONTEXT

(75) Inventors: Frank Brunswig, Heidelberg (DE); Adam Polly, Stutensee (DE); Gerd M. Ritter, Heidelberg (DE)

(73) Assignee: SAP AG, Walldorf (DE)

( * ) Notice: Subject to any disclaimer, the term of this patent is extended or adjusted under 35 U.S.C. 154(b) by 1570 days.

(21) Appl. No.: 11/961,365

(22) Filed: Dec. 20, 2007

(65) Prior Publication Data

US 2009/0165079 A1   Jun. 25, 2009

(51) Int. Cl.
*G06F 7/04* (2006.01)

(52) U.S. Cl.
USPC ............ 726/1; 726/4; 726/5; 726/6; 726/2; 705/67; 705/76; 705/77

(58) Field of Classification Search
USPC .......... 726/1, 2, 4, 5, 18, 21, 6; 713/153, 155, 713/167; 705/50
See application file for complete search history.

(56) References Cited

U.S. PATENT DOCUMENTS

| | | | |
|---|---|---|---|
| 2002/0120741 A1* | 8/2002 | Webb et al. | 709/225 |
| 2003/0093694 A1* | 5/2003 | Medvinsky et al. | 713/201 |
| 2004/0133797 A1* | 7/2004 | Arnold | 713/200 |
| 2007/0143775 A1* | 6/2007 | Savoor et al. | 725/1 |

OTHER PUBLICATIONS http://citeseerx.ist.psu.edu/viewdoc/summary?doi=10.1.1.76.4599 "A SLA-Oriented WSRF Container Architecture" —May 2007, CiteSeerX, Penn St. Univ.*
http://gridbus.cs.mu.oz.au/papers/SLA-basedContainers-eScience2007.pdf "A SLA-Oriented Management of Containers for Hosting Stateful Web Services" Gridbus 2007.*

* cited by examiner

*Primary Examiner* — Randy Scott
(74) *Attorney, Agent, or Firm* — Mintz Levin Cohn Ferris Glovsky and Popeo, P.C.

(57) ABSTRACT

A context for a service request made by a service consumer can be used to establish a constraint rules set that is applied by a service provider. A context associated with a first service request can be received from a service consumer. An identity of the service consumer can be verified. A constraint value request associated with the service request can be received from a service provider responding to the service request. One or more constraints can be derived from the first context. An identity of a service provider that will fulfill the service request can be verified. The one or more constraints can be provided to the service provider. Related systems, apparatus, methods, and/or articles are also described.

9 Claims, 6 Drawing Sheets

DERIVING SERVICE PROVIDER CONSTRAINTS FROM SERVICE CONSUMER CONTEXT

FIELD

The subject matter described herein relates to derivation of service provider constraints from service consumer context.

BACKGROUND

In many instances, it can be desirable to tailor the behavior of a service provider to the context in which it interacts with a client or consumer. For example, a service provider based on a back end database or enterprise resource server could provide limited access to certain data objects, business objects, or the like to one level of user or service consumer and greater access to these and other data objects to a user or service consumer with more extensive permissions. Currently available methods for accomplishing this task include having a service provider conduct a weak property check on services being requested by the service consumer. Alternatively, when the service consumer is an "availability-to-promise" (ATP) check, triggering of outbound agents can be blocked in a service called by the ATP check. Alternatively, connection of query parameters can be modified for a service to be provided depending on the context of the service consumer. These measures can result in performance slowdowns due to the need for the service provider to handle constraint settings for each consumer service request.

SUMMARY

In one aspect, a context associated with a first service request is received from a service consumer. An identity of the service consumer is verified, optionally to determine that the service consumer has a permission level that permits the service consumer to set the associated context setting. A constraint value request associated with the service request is received from a service provider responding to the service request. One or more constraints are derived from the first context. An identity of a service provider that will fulfill the service request is verified, optionally to determine that the service provider is accessible under the corresponding constraint rule definition set. The one or more constraints are provided to the service provider.

In some variations one or more of the following can optionally be included. A second context associated with a second service request related to fulfilling the service request can be received from the service consumer. A second constraint request associated with the second service request can be received from a second service provider responding to the second service request. One or more second constraints can be derived from the second context. A second identity of a second service provider that will fulfill the second service request can be verified, optionally to determine that the second service provider is accessible under the second one or more constraints. The second one or more constraints can be provided to the second service provider.

Additional variations can optionally include the service request being received from the service consumer by a rules engine that includes a context controller and a constraint controller. The context controller can populate a context container regarding the context setting of the service request and make the populated context container that contains an overall context available to be accessed by the constraint controller. The rules engine can optionally be implemented on a different computer than either the service consumer or the service provider. The associated context can optionally be received from the service consumer in response to the context controller returning an initial context container to the service consumer. After receiving the initial context container by the context controller, the service consumer adds one or more context categories to the context container to create a populated context container. The context controller checks a permissions database to verify that the context category value in the populated context container can be set by the service consumer, and adds the context container to the overall context which is available to the constraint controller. Each service consumer in the stack hierarchy can provide a context container with its part of the overall context to the context controller. All context containers together build the overall context, which is evaluated by the rules engine to derive constraints. The identifying of the corresponding constraint rule definition set for the associated context can optionally further include accessing the context container and deriving an appropriate constraint category value that corresponds to the content of the context container. The service provider can optionally be one of a back end application server, a database, a Web service server, and a portal server.

In an interrelated aspect, a system includes a memory that stores machine readable instructions and a processor that receives the machine readable instructions from the memory to execute a rules engine. The rules engine includes a context controller that receives a context associated with a service request from a service consumer, checks a service consumer identity, verifies a consumer permission set associated with the service consumer, and maintains the overall context. The rules engine also includes a constraint controller that receives a request for one or more constraint values from a service provider responding to the service request, accesses the context container, compares the context to a set of constraint derivation rules to derive one or more constraints, checks a service provider identity, verifies a provider permission set associated with the service provider, and provides the one or more constraints to the service provider. In some optional variations, the context controller can receive the context setting that has been pushed from the service consumer and provide the one or more constraints to the service provider on request from the service provider.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed embodiments. In the drawings.

DETAILED DESCRIPTION

The current subject matter can provide, among other possible advantages, methods, techniques, systems, apparatuses, and the like for conducting transactions between one or more service consumers, such as for example client computers querying a database or interacting with an enterprise resource planning (ERP) system, Web service clients, and the like, and one or more service providers, which can include but are not limited to back end application servers, databases, Web service servers, portal servers, and the like. A constraint value can be derived from the context for an interaction as provided by the service consumer or consumers. This constraint value can be based on a check that the context setting is allowed for the service consumer involved in the interaction and that requesting the constraint value required is allowed for the service provider.

A context setting for a transaction can provide, in some implementations, a definition for data flow between the applications, data objects, business objects, databases, servers, programs, and the like that are involved in the transaction. The context setting can be a relationship-based node structure that changes according to the specifics of a given transaction. For example, a service consumer having a "user" permission level and submitting a service request for change-enabled access to core system data has a different context than a service consumer with an "administrator" permission level requesting the same service. The context setting can also depend on the type of business process associated with the service request (i.e. an e-mail marketing campaign, processing of incoming sales orders, requests for re-orders to replenish on-site stocks, and the like), the location or locations associated with a request, types of products or services involved with the transaction, capabilities of the systems involved in providing the service, etc. Table 1 shows a list of some possible context categories and example descriptions of context settings that could be included in the categories according to some variations of the current subject matter.

TABLE 1

Examples of context categories and context setting descriptions.

| Context Category | Description |
| --- | --- |
| Business Process | The Business Process name(s) as described using the UN/CEFACT Catalogue of Common Business Processes, optionally as extended by the user. |
| Product Classification | Factors influencing semantics that are the result of the goods or services being exchanged, handled, or paid for, etc. (e.g. the buying of consulting services as opposed to materials). |
| Industry Classification | Semantic influences related to the industry or trading partners (e.g. product identification schemes used in different industries). |
| Geopolitical | Geographical factors that influence Business Semantics (e.g. the structure of an address). |
| Official Constraints | Legal and governmental influences on semantics (e.g. hazardous materials information required by law when shipping goods). |
| Business Process Role | The actors conducting a particular Business Process, as identified in the UN/CEFACT Catalogue of Common Business Processes |
| Supporting Role | Semantic influences related to non-partner roles (e.g. data required by a third-party shipper in an order response going from seller to buyer). |
| System Capabilities | This Context Category can exist to capture limitations of systems (e.g. if an existing back office can only support an address in a certain form). |

Figure 1:
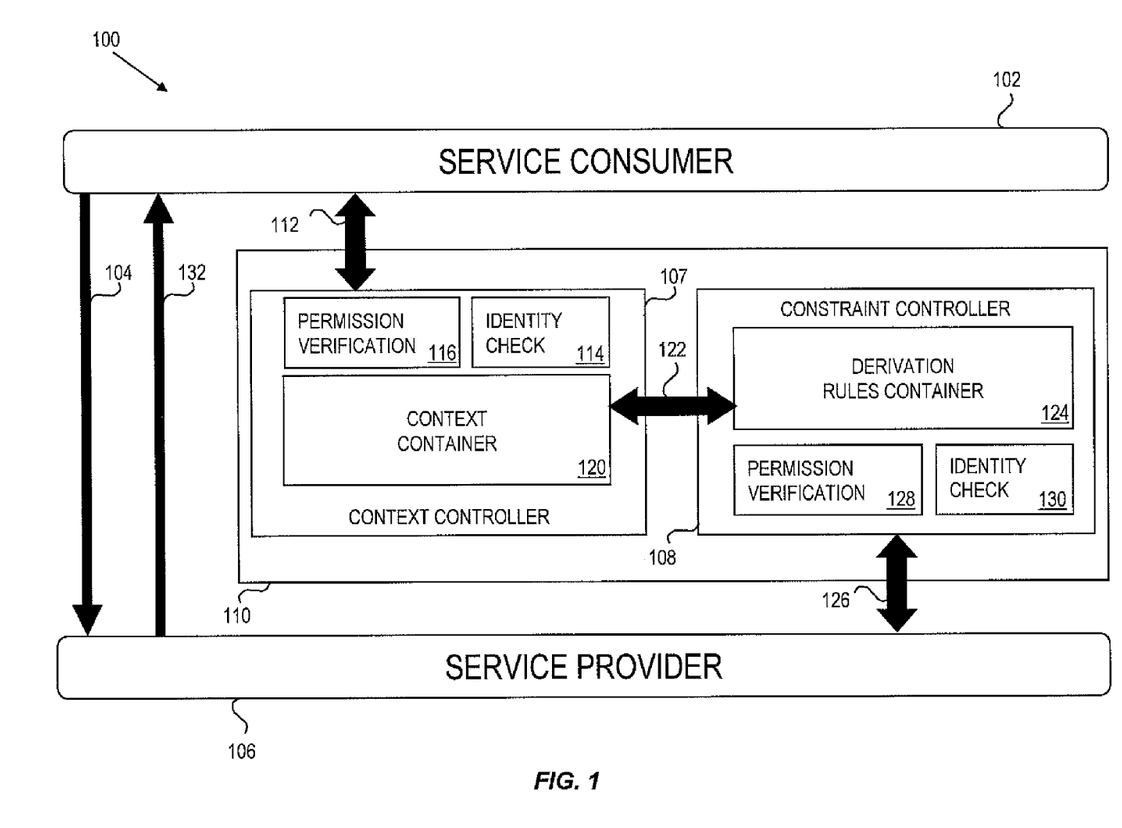
FIG. 1 is a schematic diagram illustrating a system for handling service consumer and service provider interactions.

By using context containers and constraint containers provided by a rule engine that can be implemented on an stand alone server, on a back end server that also executes one or more service provider functions, on a client machine executing a service consumer application, or on some other machine, the service provider can be freed from the need to validate consumer contexts and determine appropriate service constraints. Previous approaches to this issue have made use of design-time creation of rules and routines that govern constraints on service consumer access to service provider content. The current subject matter provides an approach that allows permissions and constraints to be determined "on the fly" in run time without adding additional processing burdens on the service provider FIG. 1 shows an exemplary implementation of a system 100. A service consumer 102 can submit a service request 104 to a service provider 106. A context controller 107 and a constraint controller 108, that can be implemented within a rule engine 110 as one or more modules on a server, on more than one server, or on the service provider or service consumer machines, handles the passing of the context 112 associated with the service request 104 to the context controller 107. The context controller 107 includes an identity module 114 or other functionality that verifies the identity of the service consumer 102 making the service request 104. The service request 104 can be a request for a service provided by the service provider and can be in a language including but not limited to WSDL, XML, SOAP, UDDI, or other languages that enable services from different systems to communicate with each other. The service request can in some examples contain one or more parameters that are the basis for a query or other data request from the service consumer. The service request 104 can be made via a framework, such as for example a messaging framework, a communications protocol, or the like, and can be via a direct connection, over a network, or by a call to an application running on the same machine. The service request 104 can invoke the service provider 106, possibly in a stack of several service providers each with one or more frameworks in between. In this example, a service consumer 102 can also be a service provider that responds to a service request and calls a second service provider as part of providing one or more services associated with the request it had received.

A permission verification module 116 or other functionality can also optionally be included to check permissions associated with the service consumer 102 and the context 112 of the service request 104 to determine if the service consumer 102 is allowed to set the context required for the service request 104. One or more checks can be performed to determine if the service consumer 102 possesses a permission level that meets or exceeds that required for the requested service. Possible examples of permission levels include but are not limited to user, super-user, administrator, identity of the service consumer, group of service consumer, etc. If the identity and/or verification processes are satisfied, a context container 120 is added to the service request context 112. The context container 120 can include descriptions of one or a plurality of context settings that could be associated with service requests from service consumers.

A context setting 122 can be delivered by the service consumer 102 into the context container 120 and then passed to a derivation rules container 124 in the constraint controller 108. The derivation rules container 124 can include descriptions of one or a plurality of constraints that could be imposed on the level of service provided by a service provider 106 based on the context setting 122 of the service request 104 as determined in the context controller 107. The service provider 106, after receiving the service request 104, accesses the constraint controller 108 with a constraint request 126. One or more of a permission verification 128 and identity check 130 module or other functionalities in the constraint controller 108 can be accessed to identify and/or verify the permissions or other constraints associated with the service provider 106 responding to the service request 104 by the service consumer 102. The service provider 106 can then provide the requested service subject or according to the constraint value 126 received from the derivation rules container 124. In this manner, the service provider 106 can derive constraints under which it can respond to a service request 104 from the context provided by the service consumer 102.

Figure 2:
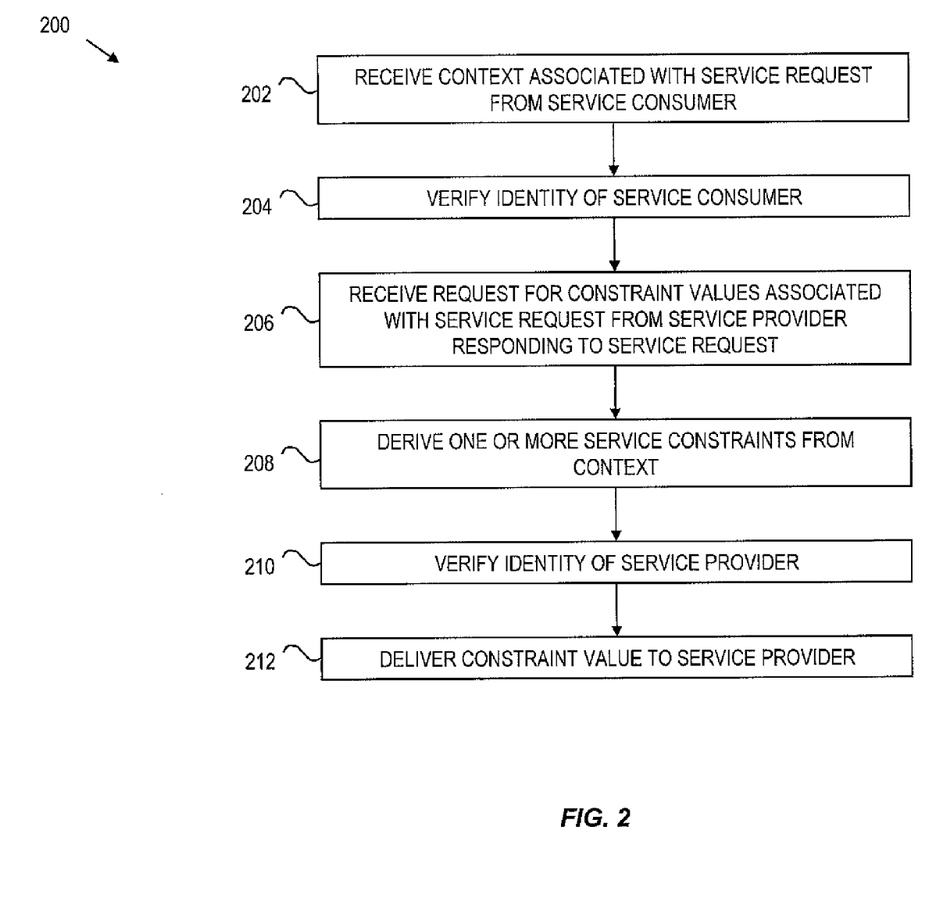
FIG. 2 is a process flow diagram illustrating a method of handling service consumer and service provider interactions.

FIG. 2 shows a process flow chart 200 illustrating aspects of a method for applying service consumer context information to derive service provider constraints. A context associated with a service request is received from a service consumer at 202. The identity of the service consumer is verified at 204, for example by an identity check module. The consumer can optionally also or alternatively be determined, for example by a permission verification module, to have a permission level necessary to set the context required for the service request. At 206, a request for a constraint value or values associated with the service request can be received from the service provider. A constraint rule value, values, or a constraint definition set is derived from the context at 208. A constraint container can optionally be added to the derived constraint value or set. The identity of the service provider that will fulfill the service request can be verified at 210, for example by an identity check module, and/or a determination can optionally be made that the service provider can be accessed under the constraint rule definition set corresponding to the appropriate context definition for the service request. The constraint clue, values, or definition set is delivered to the service provider at 212.

In some implementations, context setting can occur when a service consumer 102 requests an instance of a SET_CONTEXT routine that checks the identity of the service consumer. This process is illustrated in the example of a communication tree diagram 300 shown in FIG. 3. At 304, the service consumer 102 requests an initial context container 308 from the context controller 106 via the SET_CONTEXT instance 310. The context controller 107 checks the identity of the service consumer 302 at 312 and returns a service consumer specific instance of SET_CONTEXT at 314. The service consumer 102 then gets an initial context container from the SET_CONTEXT instance at 316. The service consumer 102 adds context type values to the context container at 320 and forwards the context container back to the SET_CONTEXT instance. At 322, the SET_CONTEXT instance can perform one or more permissions checks to determine if the service consumer 102 is allowed to set the context required for the service request. If the permissions check is successful, at 324 the SET_CONTEXT instance adds the context container to the context controller 107. The context controller 107 can then hold the context container 308 for use by a constraint controller 108 as described below.

Figure 3:
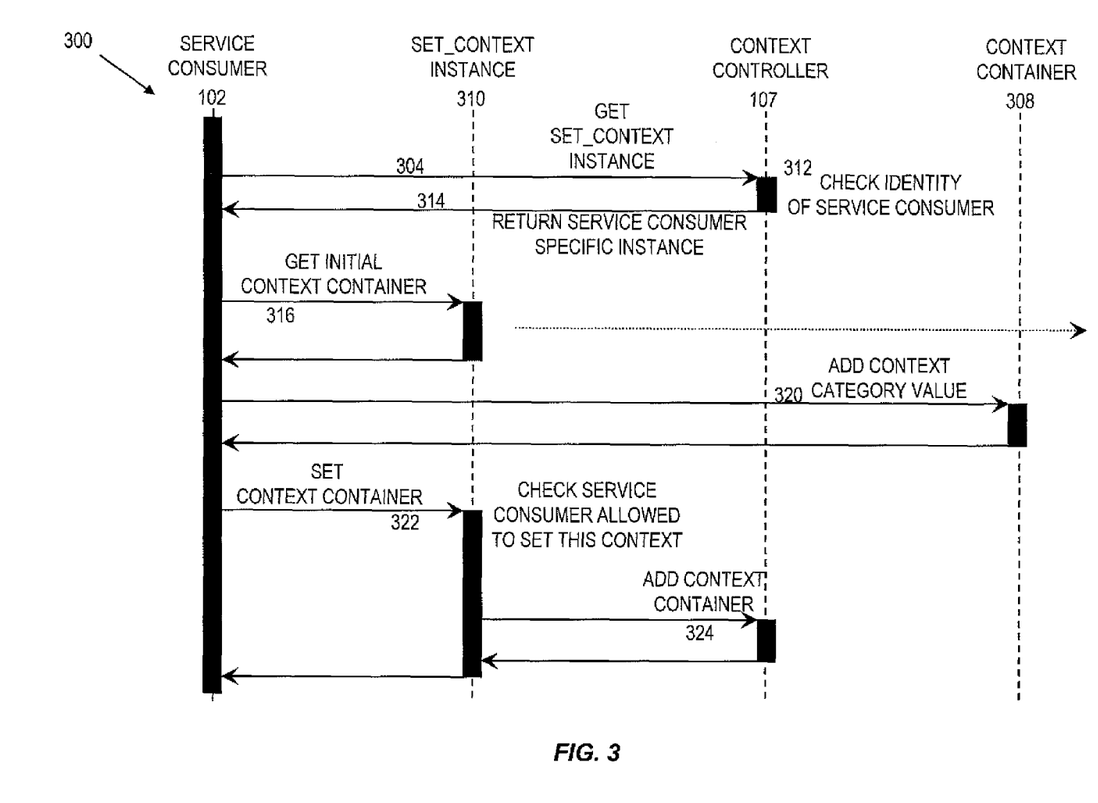
FIG. 3 is a communication tree diagram showing how a context setting can be pushed to context controller from a service consumer.

The SET_CONTEXT instance can have multiple methods during the process of context setting. The GET_CONTEXT_CONTAINER method gets an initial instance fulfilling the context container interface. The PUSH_CONTEXT_CONTAINER method submits a context container to the context controller, and the POP_CONTEXT_CONTAINER method removes a context container form the current context. The latter method can be used if the current context no longer applicable. The context controller can in some variations manage the stack level if conflicting context containers from different stack levels are active. The context controller can provide checks that mutually exclusive context containers from different stack levels are identified so that exception handling can be implemented. For example, if stack level 5 sets country='USA' and stack level 4 sets country='DE', an exception handling routine can be executed to reconcile or otherwise handle the identified discrepancies.

Figure 4:
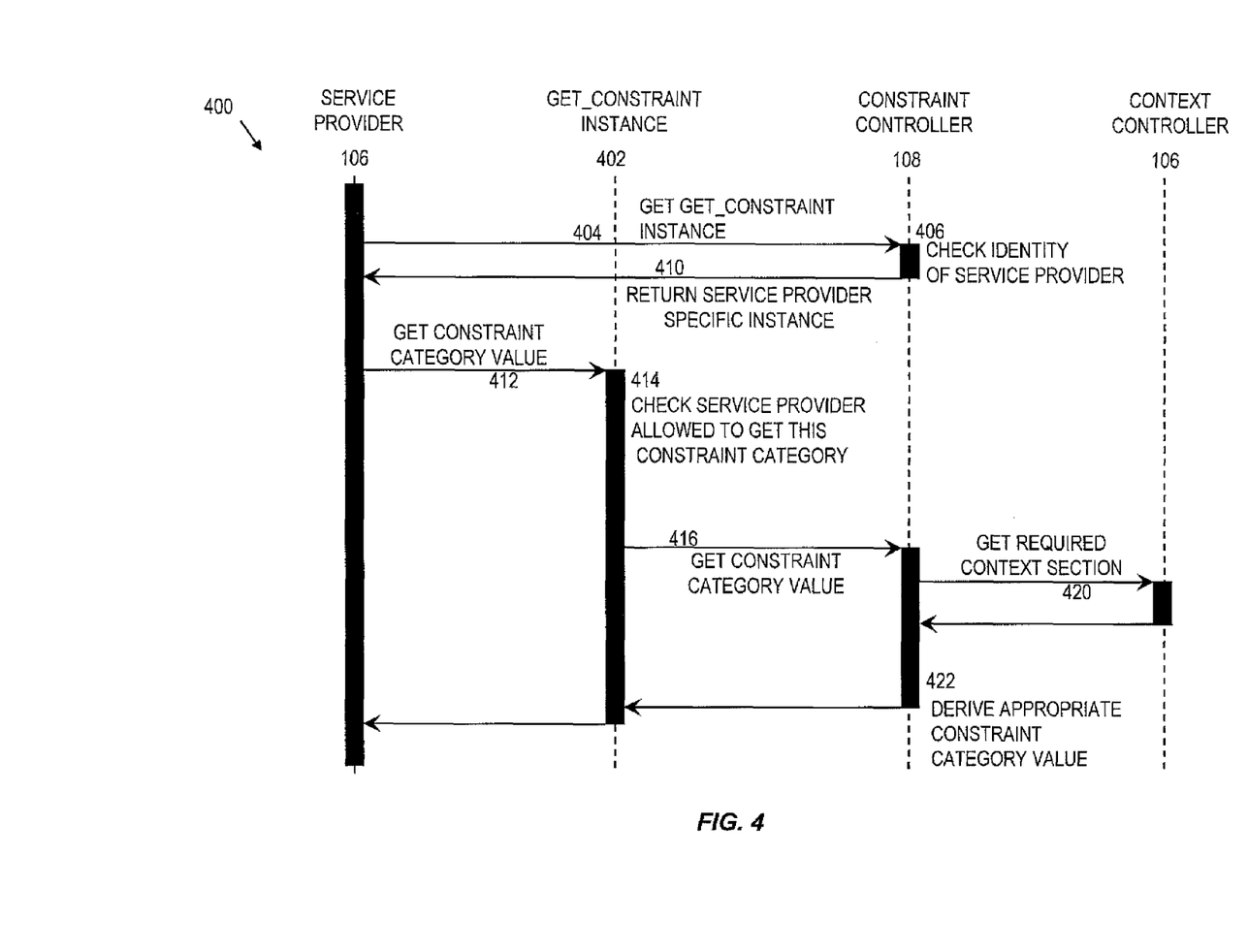
FIG. 4 is a communication tree diagram showing how a context setting can be popped to a constraint controller and on to a service provider.

The communication tree diagram 400 in FIG. 4 shows an example of the constraint setting process from the service provider 106 side. The service provider 106 requests a GET_CONSTRAINT instance 402 at 404. The constraint controller 108 checks the identity of the service provider 106 at 406 and returns a specific instance of GET_CONSTRAINT 106 at 410. The service provider 106 then requests a constraint category value from the GET_CONSTRAINT instance 402 at 412 and the GET_CONSTRAINT instance 402 can check to verify whether the service provider 106 is allowed to request the requested constraint category at 414. To do this, the GET_CONSTRAINT instance 402 forwards the request to the constraint controller 108 at 416. The constraint controller 108 retrieves the required context section from the context controller 106 at 420. The required constraint value is returned to the service provider 106 via the constraint controller 108 and the GET_CONSTRAINT instance 402 after the constraint controller 108 derives the appropriate constraint category value based on the required context section retrieved from the context controller 106 at 422. The service provider 106 then provides the requested service according to the retrieved constraint category values.

Figure 5:
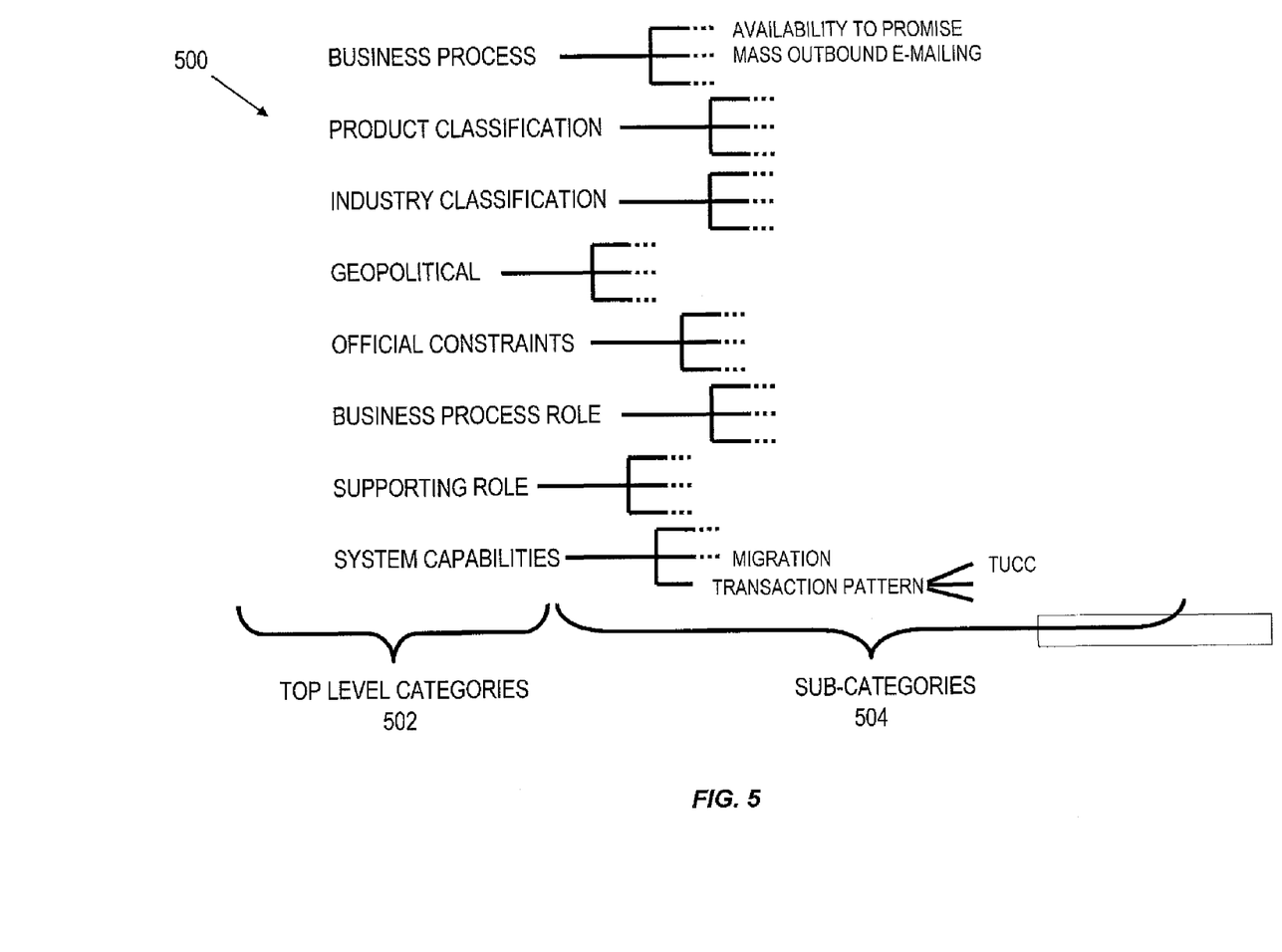
FIG. 5 is a context setting category tree.

FIG. 5 is a context hierarchy tree illustrating an example of how top level context categories 502, possibly including but not limited to those listed in Table 1 are related to lower level sub-categories 504. For example, the top level category "System Capabilities" can include sub-categories such as transaction patterns, migration, such as for example from existing legacy systems, availability to promise, and the like. Each sub-category can also contain its own additional sub-categories.

For any given transaction, an entity involved in the transaction can be a service provider or a service consumer. Furthermore, in a call stack an entity can be both a service provider to a service consumer above the stack level and a service consumer for a service provider below the stack level. One example of this is shown in the flow chart 600 of FIG. 6. A user interface 601 can initiate a mass e-mailing campaign as a service consumer. In this case, the user interface 601 invokes a mass e-mailing service from a mass e-mailing engine 602 at 603. The mass e-mailing engine 602 sets the context "Mass Outbound E-mailing" and invokes a request for e-mailing service from an e-mailing engine 604 at 605. The e-mailing engine 604 requires addresses to send the e-mails in the campaign. To retrieve these, the e-mailing program 604 can push (for example onto a stack) the context for an e-mailing business process to an address database 610 at 612. A rules engine such as is described above herein checks the pushed context, service consumer identity (in this case, the e-mailing engine 604) and permissions, and provides a constraint set to the address database 610. The address database replies to the e-mailing engine with the requested data governed by the retrieved constraint set at 613. The e-mailing engine 604 uses the retrieved data to prepare the mass e-mailing and then pops (for example from a stack) an e-mailing business process context to the mass e-mailing engine 602 at 614, which in turn pops the context to the user interface 601 at 616. Another rules engine check occurs to allow the user interface to retrieve and set appropriate constraints for the e-mailing transaction which then proceeds.

Figure 6:
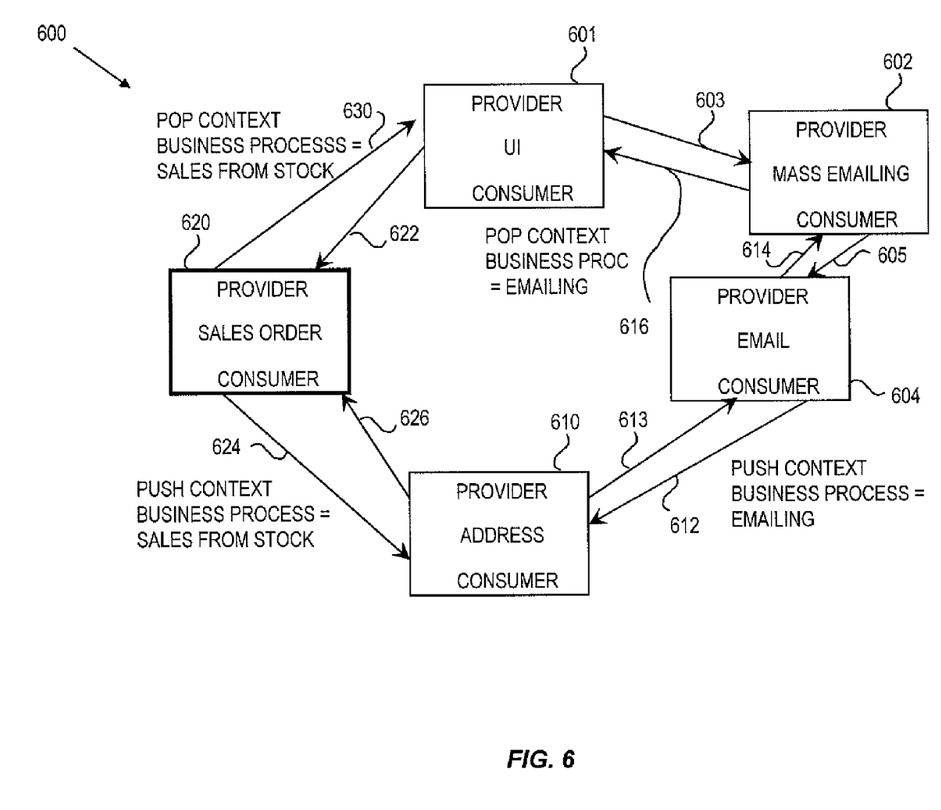
FIG. 6 is a diagram showing how service requests can be handled by multiple entities.

The user interface 602 can also interfaces with a sales order engine 620 to process a received order for a sale from in-stock merchandise. In this example, a sales request at 622 is processed through a rules engine which checks the business process context for the service consumer (the user interface 601) as well as the identity and permissions of the user interface 601. The sale from stock request is processed by the sales order engine 620 according to retrieved constraints that are compatible with the service consumer context. The sales order engine also needs the address for the purchaser, for example to ship or bill the order. To retrieve this information, the sales order engine pushes a context for the business process sales from stock to a rules engine which pops a corresponding constraint value to the address database 610 at 624. After checking the context and retrieving the appropriate constraint set for the requested service, the address database returns the needed information at 626. The sales order engine 620 can then pop the business process context for sales from stock to the user interface at 630.

In the manner illustrated in FIG. 6 and described above, a number of business processes, service providers, service consumers, applications, databases, and/or other entities can be linked to complete a complex transaction or task according to the context setting for the transaction or task. Context settings and the service provider constraints that need to be associated with them can be relayed between a series of entities or over a network of entities. Context setting values are pushed to a context container from a service consumer and then a constraint setting is derived for a service provider from a constraint container that receives and reads the context container. Because any given service request may require interactions between a number of entities, each alternating function as a service consumer or a service provider, and because each entity may have its own context-dependent constraints, removing the context-constraint interaction from the service provider onto a rules engine can effect substantial advantages in resource management and processing efficiency.

The subject matter described herein may be embodied in systems, apparatus, methods, and/or articles depending on the desired configuration. In particular, various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein do not require the particular order shown, or sequential order, to achieve desirable results. Other embodiments may be within the scope of the following claims.

What is claimed:

1. A system comprising:
   a memory that stores machine readable instructions; and
   at least one processor that receives the machine readable instructions from the memory to execute operations comprising:
   returning an initial context container to a service consumer implemented on a first other processing system in response to receiving a service request from the service consumer, the service consumer comprising a first entity of a plurality of entities required to be linked to complete a complex transaction or task;
   receiving, from the service consumer, a populated context container comprising the initial context container to which the service consumer has added one or more context categories associated with the service request;
   checking a service consumer identity of the service consumer;
   verifying a consumer permission set associated with the service consumer, the verifying comprising checking a permissions database to verify that the context category value in the populated context container can be set by the service consumer;
   adding the populated context container to an overall context set of the complex transaction or task, the overall context set further comprising one or more additional context categories received in one or more additional populated context containers from one or more additional service consumers that included in the plurality of entities;
   accessing the overall context set and a derivation rules container comprising descriptions of one or more constraints imposable on a level of service provided by entities of the plurality of entities, the accessing comprising identifying, from the derivation rules container, at least one of permissions and constraints associated with a service provider identity of a service provider responding to the service request, the service provider comprising a second entity of the plurality of entities that is implemented on a second other processing system distinct from the first other processing system; and
   providing the at least one of permissions and constraints to the service provider such that the service provider fulfills the service request in accordance with the at least one of permissions and constraints,
   wherein the returning, receiving, checking, verifying, adding, accessing, and providing are performed by the system comprising the at least one processor, which is distinct from the first other processing system and also distinct from the second other processing system, which are also distinct from each other.

2. The system according to claim 1, wherein the service provider identity is verified to determine that the service provider can receive the one or more constraints.

3. The system according to claim 1, wherein a context controller receives a context setting that has been pushed from the service consumer and provides the one or more constraints to the service provider on request from the service provider.

4. A method comprising:
   returning an initial context container to a service consumer implemented on a first other processing system in response to receiving a service request from the service consumer, the service consumer comprising a first entity of a plurality of entities required to be linked to complete a complex transaction or task;
   receiving, from the service consumer, a populated context container comprising the initial context container to which the service consumer has added one or more context categories associated with the service request;
   checking a service consumer identity of the service consumer;
   verifying a consumer permission set associated with the service consumer, the verifying comprising checking a permissions database to verify that the context category value in the populated context container can be set by the service consumer;
   adding the populated context container to an overall context set of the complex transaction or task, the overall context set further comprising one or more additional context categories received in one or more additional populated context containers from one or more additional service consumers that included in the plurality of entities;
   accessing the overall context set and a derivation rules container comprising descriptions of one or more constraints imposable on a level of service provided by entities of the plurality of entities, the accessing comprising identifying, from the derivation rules container, at least one of permissions and constraints associated with a service provider identity of a service provider responding to the service request, the service provider comprising a second entity of the plurality of entities that is implemented on a second other processing system distinct from the first other processing system; and
   providing the at least one of permissions and constraints to the service provider such that the service provider fulfills the service request in accordance with the at least one of permissions and constraints,
   wherein the returning, receiving, checking, verifying, adding, accessing, and providing are performed by at least one processor, which is distinct from the first other processing system and also distinct from the second other processing system, which are also distinct from each other.

5. The method according to claim 4, wherein the service provider identity is verified to determine that the service provider can receive the one or more constraints.

6. The method according to claim 4, wherein a context controller receives a context setting that has been pushed from the service consumer and provides the one or more constraints to the service provider on request from the service provider.

7. A computer program product comprising a machine-readable storage device embodying executable instructions that, when executed by at least one processor, cause the at least one processor to perform operations comprising:

returning an initial context container to a service consumer implemented on a first other processing system in response to receiving a service request from the service consumer, the service consumer comprising a first entity of a plurality of entities required to be linked to complete a complex transaction or task;

receiving, from the service consumer, a populated context container comprising the initial context container to which the service consumer has added one or more context categories associated with the service request;

checking a service consumer identity of the service consumer;

verifying a consumer permission set associated with the service consumer, the verifying comprising checking a permissions database to verify that the context category value in the populated context container can be set by the service consumer;

adding the populated context container to an overall context set of the complex transaction or task, the overall context set further comprising one or more additional context categories received in one or more additional populated context containers from one or more additional service consumers that included in the plurality of entities;

accessing the overall context set and a derivation rules container comprising descriptions of one or more constraints imposable on a level of service provided by entities of the plurality of entities, the accessing comprising identifying, from the derivation rules container, at least one of permissions and constraints associated with a service provider identity of a service provider responding to the service request, the service provider comprising a second entity of the plurality of entities that is implemented on a second other processing system distinct from the first other processing system; and providing the at least one of permissions and constraints to the service provider such that the service provider fulfills the service request in accordance with the at least one of permissions and constraints, wherein the returning, receiving, checking, verifying, adding, accessing, and providing are performed by the at least one processor, which is distinct from the first other processing system and also distinct from the second other processing system, which are also distinct from each other.

8. The computer program product of claim 7, wherein the service provider identity is verified to determine that the service provider can receive the one or more constraints.

9. The computer program product device of claim 7, wherein a context controller receives a context setting that has been pushed from the service consumer and provides the one or more constraints to the service provider on request from the service provider.

* * * * *